(12) United States Patent
Livingstone et al.

(10) Patent No.: US 7,195,203 B2
(45) Date of Patent: Mar. 27, 2007

(54) WING SKIN AND METHOD OF MANUFACTURE THEREOF

(75) Inventors: Mark Livingstone, Brynteg (GB); Darren Crew, Hanham (GB); Stephen Bell, Saltford (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 10/509,149

(22) PCT Filed: Mar. 25, 2003

(86) PCT No.: PCT/GB03/01272

§ 371 (c)(1),
(2), (4) Date: Sep. 27, 2004

(87) PCT Pub. No.: WO03/082670

PCT Pub. Date: Oct. 9, 2003

(65) Prior Publication Data

US 2005/0224652 A1   Oct. 13, 2005

(30) Foreign Application Priority Data

Mar. 27, 2002   (GB) ................................. 0207239.5

(51) Int. Cl.
*B64C 1/00* (2006.01)
(52) U.S. Cl. .................................................... 244/124
(58) Field of Classification Search ..... 244/117 R–133
See application file for complete search history.

(56) References Cited

U.S. PATENT DOCUMENTS

| 1,164,684 | A | * | 12/1915 | Tolman | 244/123.1 |
| 1,164,891 | A | * | 12/1915 | Tolman | 244/123.1 |
| 1,355,611 | A | * | 10/1920 | MacLeod | 244/123.1 |
| 1,855,768 | A | * | 4/1932 | Norquist | 244/123.12 |
| 2,077,732 | A | * | 4/1937 | Adams | 244/123.12 |
| 2,090,038 | A | * | 8/1937 | Goddard | 244/123.1 |

(Continued)

FOREIGN PATENT DOCUMENTS

CA     1198322     12/1985

(Continued)

OTHER PUBLICATIONS

John Hartmann et al., *Automated Wing Panel Assembly for the A340-600*, Society of Automotive Engineers, Inc., 2000, 11 pages.

*Primary Examiner*—Teri Pham Luu
*Assistant Examiner*—Stephen A Holzen
(74) *Attorney, Agent, or Firm*—Patterson, Thuente, Skaar & Christensen, P.A.

(57)   ABSTRACT

A simplified structure for a wing skin and wing box wherein the internal surface (2) of an aircraft wing skin panel (1) in the wing box includes a multiplicity of strips (3), each strip being associated with a stringer. The strips (3) have different gradients in the span-wise direction S, which is the direction in which the strips extend. The surface of each strip is, in the chord-wise direction C, parallel to the external surface (5). At a junction, at which a rib meets a stringer, the interior surface (2) has an area (4a) that is parallel to the exterior surface (5), such that the rib and stringer at that junction may be simply attached to the wing skin panel (1).

10 Claims, 8 Drawing Sheets

U.S. PATENT DOCUMENTS

| | | | |
|---|---|---|---|
| 2,275,038 A * | 3/1942 | Whitesell, Jr. et al. | 244/123.12 |
| 2,310,765 A * | 2/1943 | Dornier | 244/117 R |
| 2,367,750 A * | 1/1945 | Berkow et al. | 244/123.2 |
| 2,372,510 A * | 3/1945 | Mitchell | 244/123.2 |
| 2,407,614 A * | 9/1946 | Montgomery et al. | 244/123.1 |
| 2,427,853 A * | 9/1947 | Goodlett | 244/123.2 |
| 2,836,267 A * | 5/1958 | Reinhold | 52/404.1 |
| 2,997,262 A * | 8/1961 | Kirk et al. | 244/123.12 |
| 3,023,860 A * | 3/1962 | Ellzey | 244/120 |
| 3,118,639 A * | 1/1964 | Kiceniuk | 244/219 |
| 3,195,841 A * | 7/1965 | Krohn | 244/123.12 |
| 3,429,023 A * | 2/1969 | Blythe et al. | 29/404 |
| 3,507,634 A * | 4/1970 | O'Driscoll | 428/573 |
| 3,706,430 A * | 12/1972 | Kline et al. | 244/35 R |
| 3,775,238 A * | 11/1973 | Lyman | 428/167 |
| 3,806,065 A * | 4/1974 | Custer | 244/12.6 |
| 4,025,996 A * | 5/1977 | Saveker | 428/594 |
| 4,225,372 A * | 9/1980 | Kinzler et al. | 156/154 |
| 4,411,940 A * | 10/1983 | Derkacs et al. | 428/73 |
| 4,749,155 A * | 6/1988 | Hammer et al. | 244/123.7 |
| 5,165,627 A * | 11/1992 | Amano et al. | 244/119 |
| 5,534,354 A * | 7/1996 | Gregg et al. | 428/593 |
| 5,639,535 A * | 6/1997 | McCarville | 428/119 |
| 5,944,286 A * | 8/1999 | Morris et al. | 244/131 |
| 6,114,012 A * | 9/2000 | Amaoka et al. | 428/182 |
| 6,197,146 B1 * | 3/2001 | Sucic et al. | 156/245 |
| 6,217,000 B1 * | 4/2001 | Younie et al. | 249/184 |

FOREIGN PATENT DOCUMENTS

| | | |
|---|---|---|
| EP | 078891 | 5/1983 |
| GB | 195686 | 3/1923 |
| GB | 1008671 | 11/1965 |

* cited by examiner

Fig. 1

Prior Art

WING SKIN AND METHOD OF MANUFACTURE THEREOF

The present invention relates to a wing skin for an aircraft. In particular, the present invention relates to the shape of the surface of a metallic wing skin that is inside the wing box of an aircraft. The invention also relates to a wing box including such a wing skin, an aircraft including such a wing skin, and a method of designing and a method of manufacturing the same.

Commonly, the manufacture of metal wing skins includes a step in which the shape of the interior surface of the wing skin (the surface that is inside the wing box) is designed. This step is performed in parallel with the design of the shape and configuration of the other components of the wing box for example, relating to the arrangement of the spars, ribs, stringers, the positioning of access points in the wing and the arrangement of any particular components that might cause loading of the wing box. The step of determining a suitable shape of the interior surface of the wing skin should preferably minimise the mass of the metal wing skin whilst meeting the various criteria regarding the loading of the skin and the internal structure of the wing box.

Figure 1:
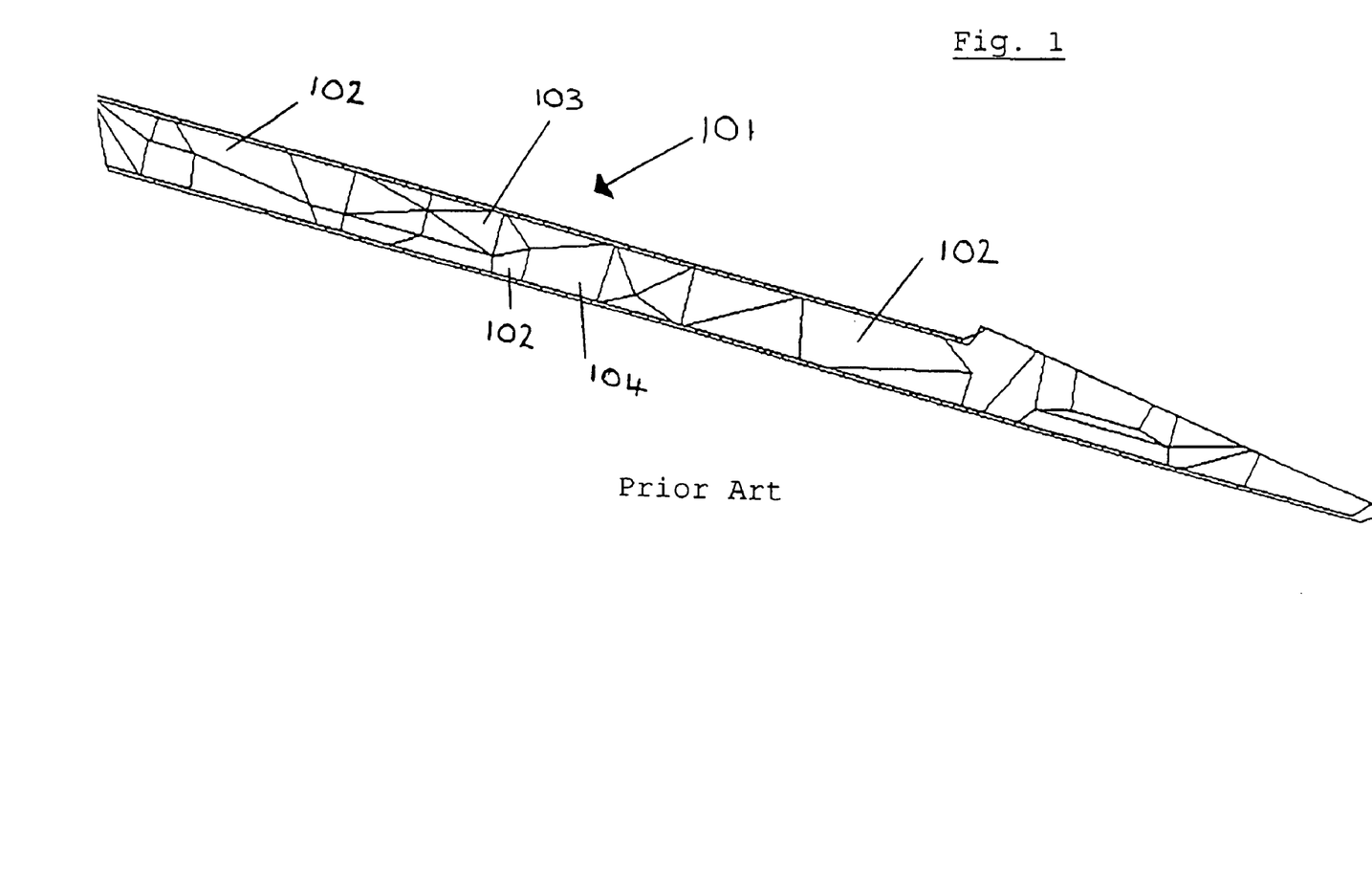
FIG. 1 shows in plan view a wing skin section of the prior art.

In a known method, the shape of the interior surface of the metal wing skin is first modelled by a wing skin designer by means of a faceted surface, that is, a surface primarily defined by regions (mostly polygons) of constant gradient. FIG. 1 shows a metal wing skin panel 101 for forming a part of the upper wing skin of a wing box made in accordance with such a method. The panel 101 is divided into a multiplicity of faceted surfaces 102. The panel is initially machined as a flat metal panel and thereafter bent into the desired aerodynamic shape. Before bending the panel, each faceted surface is flat and has a constant gradient. The facets are in the form of triangles 103 or quadrilaterals 104. Increasing the number of facets provides more flexibility over the shape of the interior surface and therefore allows the mass of the wing skin to be reduced. However, increasing the number of facets significantly increases the duration of the design process and ultimately the manufacturing process.

The design of the wing box can require several revisions of design of the shape of the interior surface of the wing skin, each change in shape affecting the design and arrangement of the parts forming the rest of the wing box, and each change in the design and arrangement of those parts affecting the suitability of the shape of the interior surface of the wing skin. Small changes in one aspect of the design can require significant changes to be made to other aspects of the design of the wing box. Traditionally, therefore, the design of the shape of the interior surface of the wing skin has been an iterative and therefore time-consuming process.

It is an object of the present invention to provide an improved wing skin and/or to provide a method of designing and manufacturing the same and/or to provide an improved method of designing and manufacturing a wing skin.

According to a first aspect of the present invention there is provided an aircraft wing skin comprising a first surface for forming at least a part of the external surface of an aircraft wing and a second surface opposite the first surface, wherein the second surface comprises a multiplicity of strips extending in substantially the same direction.

Thus the present invention provides a wing skin that can be designed and manufactured without needing to divide the surface into facets. Whilst, the number of strips according to the present invention that form the interior surface of a wing skin may be much greater than the number of facets that would typically be used to define the surface on a wing skin of a given aircraft, the wing skin design and manufacturing time need not be much greater and is advantageously significantly less according to the present invention. Furthermore, significant mass savings may be made without prejudicing the load carrying ability of the wing skin and preferably without significantly increasing manufacturing times. The invention is of particular application to metallic wing skins, for example where the wing skin (which may comprise a portion only of the entire wing skin for a wing of an aircraft) is in the form of a monolithic structure.

It will be understood that the wing skin may be so sized that more than one wing skin as defined herein is required to form the entire wing skin of a wing box of an aircraft. For example, the wing skin according to the present invention may be so shaped to form a section of either the upper or lower wing skin of an aircraft wing box. Three, four or more such sections may for example be required to form the upper of lower wing skin of the wing box. Thus a single wing skin according to the present invention may be suitable for forming a part only of the external surface of an aircraft wing.

The surface defined by the strips is preferably such that the general outlines, in plan view, of the respective strips are visible with the naked eye (as viewed in a given direction). The second surface may be so shaped that there are at least two strips that, at respective points on a notional line that is perpendicular to the direction in which the strips extend, have different gradients in the direction in which the strips extend, each of the gradients of said at least two strips being non-parallel in relation to the gradient of the first surface directly opposite. The second surface may be so shaped that, if mapped onto a generally flat surface, there would be at least two strips that, at respective points on a notional line that is perpendicular to the direction in which the strips extend, have different gradients in the direction in which the strips extend. The second surface is preferably so shaped that the thickness of the wing skin varies both in a direction along the length of the strips and in a transverse direction from one strip to the next. The variation in the thickness of the wing skin in a direction transverse to the length of the strips may be substantially constant across almost the entire width of the strip varying by a significant amount only from the transition between one strip and the next. Preferably, the thickness of the wing skin is substantially constant across at least 75% of the width of a strip, and more preferably across at least 90% of the width of a strip.

Preferably, the strips are long and thin in shape. For example, each strip is preferably more than 3 times as long as its average width, and more preferably more than 6 times as long. Preferably, each strip has a significant portion where the notional edges of the strip at the second surface are substantially parallel to each other.

It will be appreciated that the shortest distance from the first surface to a given point on the surface of a strip at the second surface defines the thickness of the wing panel at that given point. The strips may therefore be considered as being three-dimensional in shape, the body of each strip extending from the first surface to the second surface, the shape of a strip being defined mainly by the shape of the second surface of the wing skin. Because the wing skin may be formed from a monolithic structure, the boundaries of the strips may be somewhat notionally defined. However, for the sake of convenience the shape of a strip below the surface of the second surface may be defined by a surface described by the movement of a notional straight line normal to the first surface that follows the outline of the strip at the second surface. Alternatively, the strips may be viewed as being the notional shapes that represent the deviation from a notional third surface, the notional third surface being parallel to the first surface and being separated as far from the first surface as possible whilst being wholly contained within the wing skin.

Preferably each strip has along at least a significant part of its length a profile that is substantially the same shape. The profile of the strip at a given point can be considered to be defined by the notional line defined by the intersection of the upper surface of the strip and a notional perpendicularly cross-secting plane. The upper surface of a strip is the surface of the strip at the second surface excluding any side portions of the strip. It will be understood that said upper surface forms a part of the second surface that may, when the wing skin forms part of a wing box, be inside the wing box as a part of the upper wing skin or the lower wing skin. The profile of each strip is advantageously substantially parallel to the part of the first surface directly opposite the profile. Such an arrangement may simplify design, and modelling of the wing skin and may also simplify manufacture.

Preferably, the multiplicity of strips each have a continuous shape along their length. For example, the majority of the strips preferably have no discontinuities along their length. It will be understood that in the present context a discontinuity can be regarded as a relatively short portion of the strip having a relatively high gradient slope. At least some of the strips may, of course, be arranged end to end.

The relative gradient of the strips, that is the gradient in the direction in which the strips extend, of the slope of the upper surface of each of the strips relative to the slope, if any, of the first surface is preferably substantially constant at least along a significant part of each strip, more preferably along the majority of the length of the strip and yet more preferably along substantially the entire length of the strip. The relative gradient along the length of each strip is preferably less than 1 in 50 for the majority of the length of the strip and more preferably for substantially the entire length of the strip. More preferably, the relative gradient along the length of each strip is less than 1 in 100 for the majority of the length of the strip and even more preferably for substantially the entire length of the strip.

Advantageously, the wing skin is so arranged that at least one strip meets another strip, in the direction in which the strips extend, at a strip junction, the strip junction having a gradient different from the average gradient of at least one of the strips. Preferably, the wing skin has a multiplicity of such junctions. Preferably, the wing skin has at least two junctions each being arranged to receive a respective rib foot of a single rib extending along the wing skin. Each junction may be so arranged that the respective surfaces are substantially parallel to the surfaces of the rib feet that interface with the respective surfaces. For example, there may be a multiplicity of such junctions such that the wing skin is able to receive a plurality of ribs wherein the majority of the rib feet interface with the junctions. It will be understood that the rib foot need not be directly attached to the strip junction, but may for example be connected via a separate component. The surface which interfaces with the rib foot is conveniently substantially perpendicular to the direction of the extension of the part of the rib to which the rib foot is attached.

Preferably, the wing skin has a plurality of strip junctions, the strip junctions each joining two strips in the direction in which the strips extend, having an interface surface arranged to be able to receive a respective rib foot of a single rib extending along the wing skin, and being so arranged that the respective interface surfaces are substantially parallel to the first surface and substantially parallel to the surfaces of the rib feet that interface with the respective interface surfaces. Having such interface surfaces can facilitate a simplification of the design process when designing a wing box including a wing skin which is attached to ribs. For example, when designing the support structure including the ribs of a wing box it can be assumed that interfaces between the wing skin and say, the ribs, are always parallel to the first surface. The thickness of the wing skin in the region of a strip junction is advantageously substantially constant.

The strips preferably extend in a span-wise direction. A plurality of strips are preferably so arranged that each such strip is positioned between two strips that are directly adjacent to it. More preferably, the majority of the strips are positioned so that adjacent strips are directly adjacent to each other. It will be appreciated that if two directly adjacent strips have different gradients along their length, there will be a portion of one strip that is at a different height from the first surface than the adjacent portion of the adjacent strip. Thus there may be steps from strip to strip in a chord-wise direction. The steps preferably include no discontinuities. The steps between adjacent strips may have a point at which there is a sharp change in gradient, but preferably there is no sharp change in thickness of the wing skin from one strip to an adjacent strip. Preferably the maximum gradient in the step is less than 1:1.

It will be appreciated that there may be at least one strip which has a portion adjacent to a portion of another strip, wherein there is no step in height so that the boundary between the portions of the strips is notionally defined. There may be pairs of adjacent strips that are the same height along their whole length; in such a case the two strips could be considered as a single strip.

Of course, the wing skin may include portions not including any strips as defined herein. Also, the wing skin may include a multiplicity of strips each in accordance with optional aspects of the present invention as well as including further strips not in accordance with such optional aspects.

The wing skin may include regions that are shaped in a particular way to perform a particular function, such regions preferably, but possibly not, including strips in accordance with the present invention. For example, the second surface may be so shaped to accommodate or provide one or more of the following features: manholes, other cut-outs, inter manhole softening bosses, spar pads, pylon plateaus, thickened regions for example in the region of the interface to the fuselage, lightening pockets, bosses for engine mounts, and fuel bosses.

The upper surfaces of the strips may have an inconstant width. For example, portions of the strip may be wider or narrower than other portions, to allow for example for the accommodation of one of the features mentioned above or to avoid step discontinuities between strips in regions that are required to sustain higher than average loads.

Preferably the wing skin is formed from a monolithic structure. As mentioned above, the present invention has particular application wherein the wing skin is made of metal. The metal may for example be a standard alloy as conventionally used to construct wing skins. Such a standard alloy may for example be an aluminium alloy.

The present invention also provides, according to a second aspect of the invention, an aircraft wing-box including ribs, stringers extending transversely to the ribs, and a wing skin as described herein with reference to the first aspect of the present invention, wherein the strips are so arranged that each strip is associated with a single stringer. The aircraft wing-box may include a plurality of wing skins as described herein with reference to the present invention, a plurality of the wing skins forming the upper wing skin of the wing box and a plurality of the wing skins forming the lower wing skin of the wing box. The wing skin of the wing box may thus be manufactured in sections.

There is also provided in accordance with a third aspect of the present invention an aircraft including a wing box having a wing skin, at least a part of which being a wing skin according to the first aspect of the invention as described herein.

The present invention also provides, according to a fourth aspect of the invention, a method of manufacturing an aircraft wing structure including providing a block of material for machining to form a wing skin, the block having two opposing surfaces, the method including machining one of the surfaces to form the surface of the wing skin that is to be in the interior of a wing box, the machining of the surface including the steps of machining a multiplicity of strips extending in substantially the same direction.

The machining preferably includes removing material from the surface of the block thereby forming the upper surfaces of the strips. The step of the machining of the strips may be completed without removing any material from the opposite surface of the block.

The machining is conveniently so performed that it is the removal of such material that defines the shape of the strips. As mentioned above, some of the boundaries of the three dimensional strips may be somewhat notionally defined. The notional boundaries of the strips (those boundaries within the material of the block) are not of course machined when forming the strips, but it is of course the machining of the block that will define the boundaries of the strips at the surface.

Preferably, at least two of the multiplicity of strips have, at points on a notional line that is perpendicular to the direction in which the strips extend, different gradients in the direction in which the strips extend.

It will be appreciated that adjacent strips may be machined in such a way that, in the finished wing skin, the boundary between the adjacent strips is undetectable along at least a portion of the strips. However, for the sake of simplicity, the machining of such strips is preferably conducted as if the strips were separate strips.

The other of the two surfaces may be machined and further processed to form the external surface of an aircraft wing. Preferably, the wing skin is moulded, or machined, after performance of the machining steps of the present invention, to form a wing skin, or part thereof, of a wing box structure. Thus the other of the two surfaces may, when the block of material is being machined in accordance with the above-described method, be substantially flat. The method preferably includes a preliminary step of machining the surface, by for example skimming the surface with a milling machine, so that the other of the two surfaces is made to be substantially flat.

The machining is preferably performed by a milling machine. The machining of each strip preferably includes milling in one direction along the length of the strip to be formed. Each strip may be formed by means of one or more passes of a milling machine. Also, the profile of each strip, when viewed in cross-section at any section along substantially the entire length of the strip, may have substantially the same gradient and/or shape at the machined surface. The profile may for example be substantially flat and substantially parallel to the other of the two surfaces. The machining steps may include moving a rotating cutting tool, the tool progressing in a direction substantially perpendicular to the axis of rotation of the cutting tool. A change in height of a strip along its length may be machined by additionally moving the cutting tool in a direction substantially parallel to the axis of rotation as the tool progresses along the length of the strip. It will be appreciated that movement of the rotating cutting tool in a direction not exactly perpendicular to the axis of rotation will cause the machining away of a surface that has a concave profile along its length. Preferably, therefore, each strip is machined by means of several overlapping passes of the rotary cutting tool. The curvature of the profile of the resulting strip may thereby be minimised.

The machining may be performed with a single milling or cutting machine that creates one strip at a time. The machine may create many strips together, for example so that the creation of one strip may be commenced before another strip being created is finished. For example, the machine may create one line of strips at a time (for example, all the strips associated with a given stringer). Each strip may be machined with one pass of a single cutting tool. For example, the cutting tool could be caused to reciprocate between the sides of the strip to be formed, as the tool progresses along the length of the strip.

The method may include creating a multiplicity of plateaus that are parallel to the other of the two surfaces. The plateaus are preferably parallel to each other. The plateaus may be joined by strips. For example, the opposite surface of the block may be substantially planar, and the machining of the surface may include machining a plurality of plateaus parallel to the opposite surface of the block, the wing skin being suitable for forming the wing skin of a wing box including a plurality of ribs, each rib having a plurality of rib feet for connecting to the wing skin, the plateaus being so arranged and configured that the rib feet of the ribs are able to be mounted (directly or indirectly) on the plateaus.

The majority of the strips preferably have no discontinuities along their length. The wing skin may be bent after machining by means of mechanical treatment, shot peening, and/or creep forming so as to form the desired shape of the exterior surface of the wing.

The method may additionally include one or more steps that are performed to treat the wing skin. Such steps may for example include one or more of the following: mechanical strengthening by means of, for example, shot peening, sanding, heat treating and painting.

The method may be performed in such a way as to be suitable for manufacturing a wing skin, a wing box, and/or an aircraft in accordance with the first, second and/or third aspects of the present invention. Also, the wing skin according to the first aspect of the present invention is advantageously made by means of a method according to the fourth aspect of the invention. Similarly, the wing box and the aircraft according to the second and third aspects, respectively, of the present invention may each be advantageously made by means of the method according to the fourth aspect of the invention.

It will for example be appreciated that the flat plateaus machined in accordance with the fourth aspect may form, once a wing skin has been formed from the block of material, the strip junctions according to the first aspect.

The aircraft wing structure made by the above method may be a panel for forming a part of a wing skin of a wing box, may be a wing box, or may even be an aircraft. For example, the method may include steps in which a wing skin is produced, may include steps in which such a wing skin is attached to stringers and ribs to form at least a section of a wing box, and/or may include attaching spars to the wing skin.

The present invention also provides, according to a fifth aspect of the invention, a method of manufacturing an aircraft wing skin including the steps of designing a wing skin by means of performing the steps of mathematically modelling at least a part of a wing box structure including a wing skin and at least those parts of a plurality of ribs and stringers that interface with the wing skin, the modelled wing skin having an interior surface inside the wing box, the interior surface comprising a multiplicity of strips, the multiplicity of strips extending in substantially the same direction, modelling the loads that such a wing skin must be able to sustain in reality for safe operation, the shape of the wing skin being determined having regard to reducing the mass of the wing skin and having regard to the need for the wing skin to be able to sustain the modelled loads, and then manufacturing a wing skin substantially in accordance with the design.

The upper surfaces of the strips are advantageously planar in the model. At least two of the strips may have, at points on a notional line that is perpendicular to the direction in which the strips extend, different gradients in the direction in which the strips extend.

The wing skin that is manufactured in accordance with the design may of course have a slightly different shape from that modelled. For example, the model may be limited to the case where the wing skin is substantially flat in shape, whereas the wing skin to be manufactured is curved to adopt the shape of the exterior surface of the wing of which the wing skin is to form a part. Also, manufacturing techniques may not be able to machine the exact shape modelled. For example, the modelled shape may include discontinuities in the surface, in that the gradient at certain points may be infinite (or at least very high), because such shapes are mathematically easier to model. Such shapes may be difficult to manufacture, although it may be possible to manufacture a wing skin in accordance with, but not identical to, the modelled shape so that the differences between the shape as modelled and the shape as manufactured cause only negligible effects on the mechanical properties of the wing skin as between the wing skin as modelled and the wing skin as manufactured. The modelled loads are advantageously, at the very least, the maximum loads that need to be sustained for safe long-term operation of an aircraft including a wing box built to the modelled design. Preferably the modelled loads are those maximum loads increased by a further amount, for example, so as to further increase the safety of design.

The wing skin so manufactured may be manufactured in accordance with the fourth aspect of the present invention. Thus, the resulting wing skin as manufactured may be in accordance with the first aspect of the present invention.

Embodiments of the present invention will now be described with reference to the following schematic drawings of which.

Figure 2:
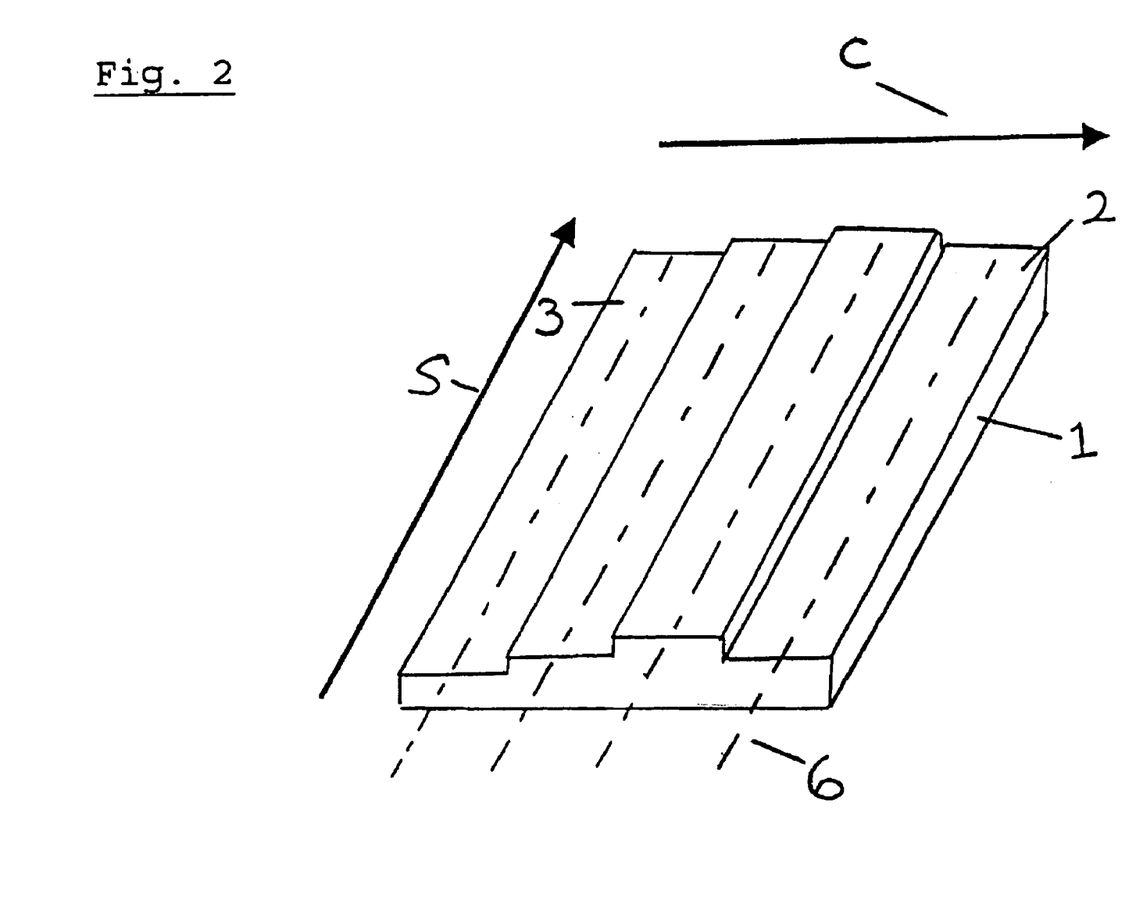
FIG. 2 shows, in perspective view, a region of the wing skin of a wing panel according to a first embodiment of the invention, the surface of the wing skin including a multiplicity of strips.

FIG. 2 shows a section of a wing skin panel 1 according to a first embodiment of the present invention. The panel 1 is a monolithic aluminium alloy structure that has an exterior surface and an interior surface 2, the interior surface 2 being inside the wing box. The exterior surface is generally smooth in shape, whereas the interior surface 2 includes regions formed of strips 3. The strips 3 run in a span-wise direction (arrow S), being parallel to the datum lines 6 of the stringers (not shown), a single strip 3 being associated with a single stringer. The strips 3 are adjacent to each other and have a generally constant width. However, certain portions of a strip may have a different width, for example, to accommodate specific features/requirements of the wing box (as will be explained later). The strips 3, shown in FIG. 2, are therefore each a stringer pitch wide.

The gradient of a strip 3 on the interior surface 2 in a chord-wise direction (arrow C) is equal to the gradient in a chord-wise direction of the exterior surface directly opposite. In other words, each strip 3 is parallel to the exterior surface in a chord-wise sense. In a span-wise direction, the strips may each be non-parallel to the exterior surface (in a span-wise sense). The gradient of each strip may for example be up to 1 in 100 gradient. The gradients of respective strips 3 are generally different.

Figure 3:
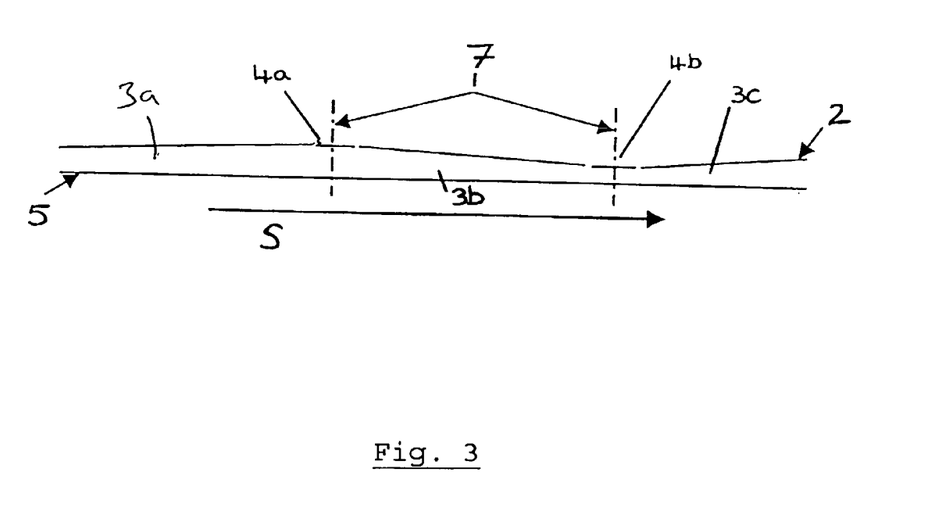
FIG. 3 shows a cross-section along the length of strips of the first embodiment.

FIG. 3 shows schematically the change in gradient in a span-wise direction (arrow S) of strips as viewed in a chord-wise direction. In FIG. 3 there are three strips 3a, 3b and 3c, each strip 3 being linked to another strip by means of a strip junction 4a, 4b. The strip junctions 4a, 4b are arranged at the junction between the datum line 6 (not shown in FIG. 3) of a stringer and the datum line 7 of the ribs (not shown), which run transversely to the stringers. The surface of the strip junction 7 is parallel both chord-wise and span-wise to the exterior surface 5. Having a surface that is parallel in both the chord-wise sense and the span-wise sense greatly simplifies the design and manufacturing of the wing box and in particular the interface between the ribs, stringers and the wing skin.

Figures 4A, 4B:
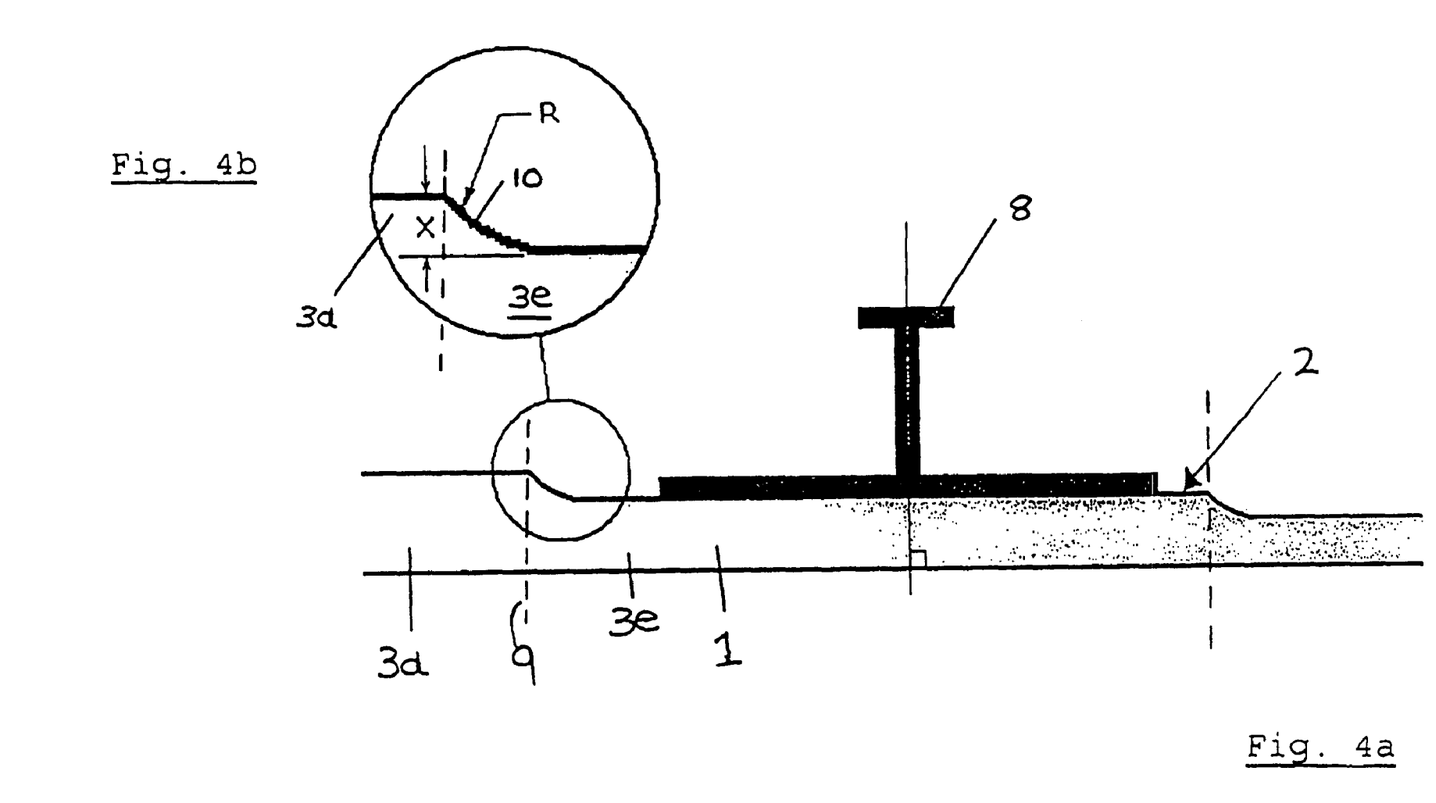
FIGS. 4a and 4b show a cross-sectional view across the length of strips showing a stringer attached to the wing skin and showing the junction between adjacent strips.

The stringers (not shown) and the ribs (not shown) are attached to the wing skin 1 in a standard manner. However, as shown in FIG. 4a, which shows a stringer 8 attached to the interior surface 2 of the panel 1, the stringer to strip interface is parallel to the exterior surface (as viewed in cross-section). The tooling required to manufacture a wing box may be made simpler owing to the fact that the interior surface 2 is parallel to the exterior surface 1 in a chord-wise sense across the majority of the wing panel. (The chord-wise direction being normal to the section shown in FIGS. 4a and 4b.)

FIG. 4a also shows the boundary 9 between two adjacent strips 3. FIG. 4b shows a magnified portion of FIG. 4a in the region of such a boundary 9. The change in height of the interior surface 2 from one strip 3d to an adjacent strip 3e is effected by means of a curved surface 10 having a radius of curvature R that is greater than or equal to twice the change X in height between one strip and the next. Avoiding discontinuities from one strip to an adjacent strip eases manufacturing and machining of the interior surface 2 and, furthermore, reduces the possibility of stress concentrations at junctions between adjacent strips 3.

Along the length of each strip the shape of the strip is continuous (that is the shape has no discontinuities). The gradient of each strip may however, in certain areas, be greater than 1 in 100 if for example the load to be sustained by the local region of the wing skin is particularly great thereby requiring thicker skin in that local area so that a steeper gradient is required in order to avoid a significant increase in mass of the wing skin.

Figure 5:
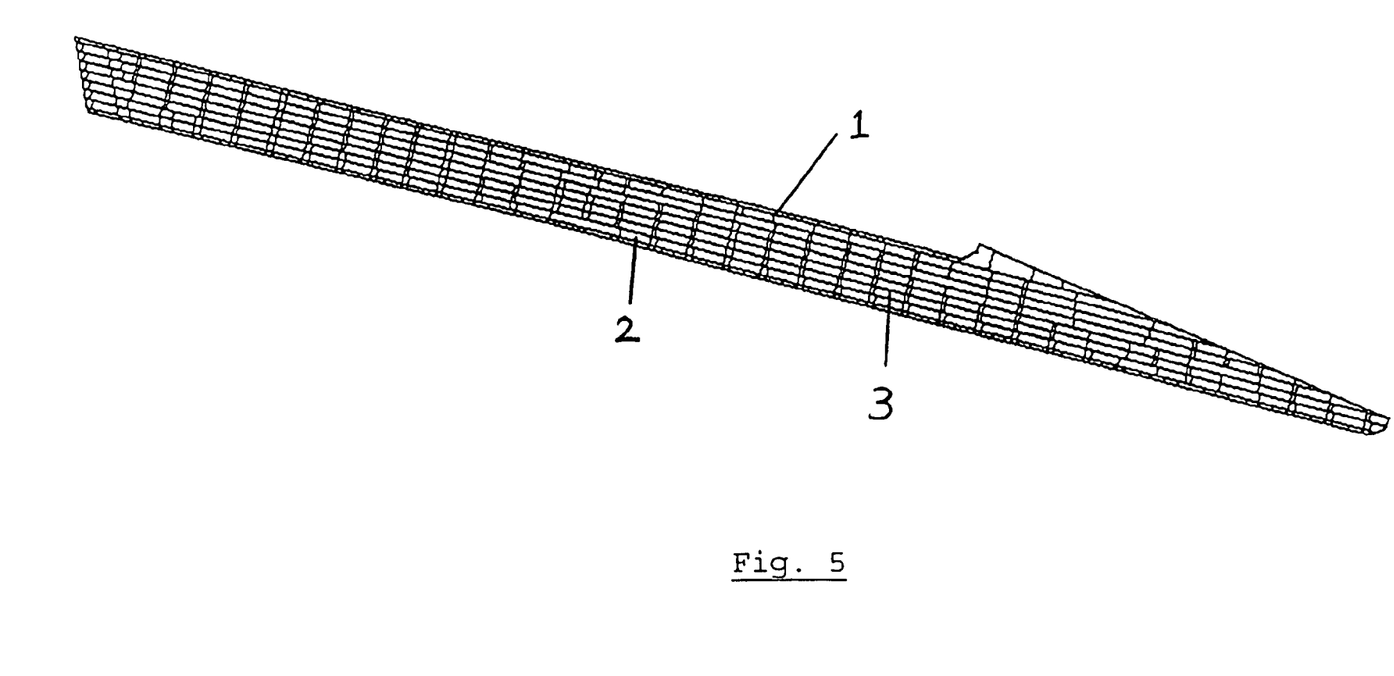
FIG. 5 shows, as a plan view, a wing skin panel according to the first embodiment.

FIG. 5 shows an interior surface 2 of the panel 1 showing how the panel 1 is divided into the multiplicity of strips 3 illustrates by FIGS. 2, 3, 4a and 4b. The panel shown in FIG. 5 is the same outline shape as the panel of the prior art shown in FIG. 1. The panel 1 according to the first embodiment meets the same criteria regarding loading as those met by the facets of the panel 101 shown in FIG. 1, but the panel 1 of FIG. 5 has a smaller mass, representing a saving in mass per aircraft equal to about 2% of the weight of the wing skin panels of the aircraft.

Figure 6:
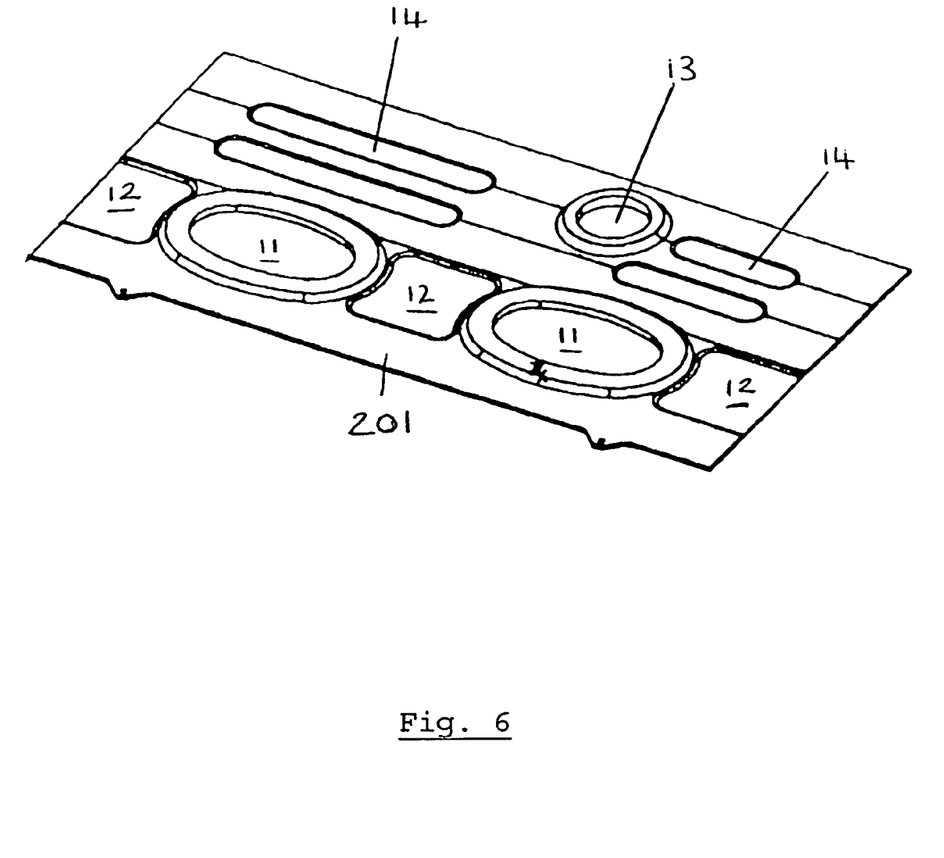
FIG. 6 shows a perspective view of a test panel in accordance with a second embodiment of the present invention.
Figure 7:
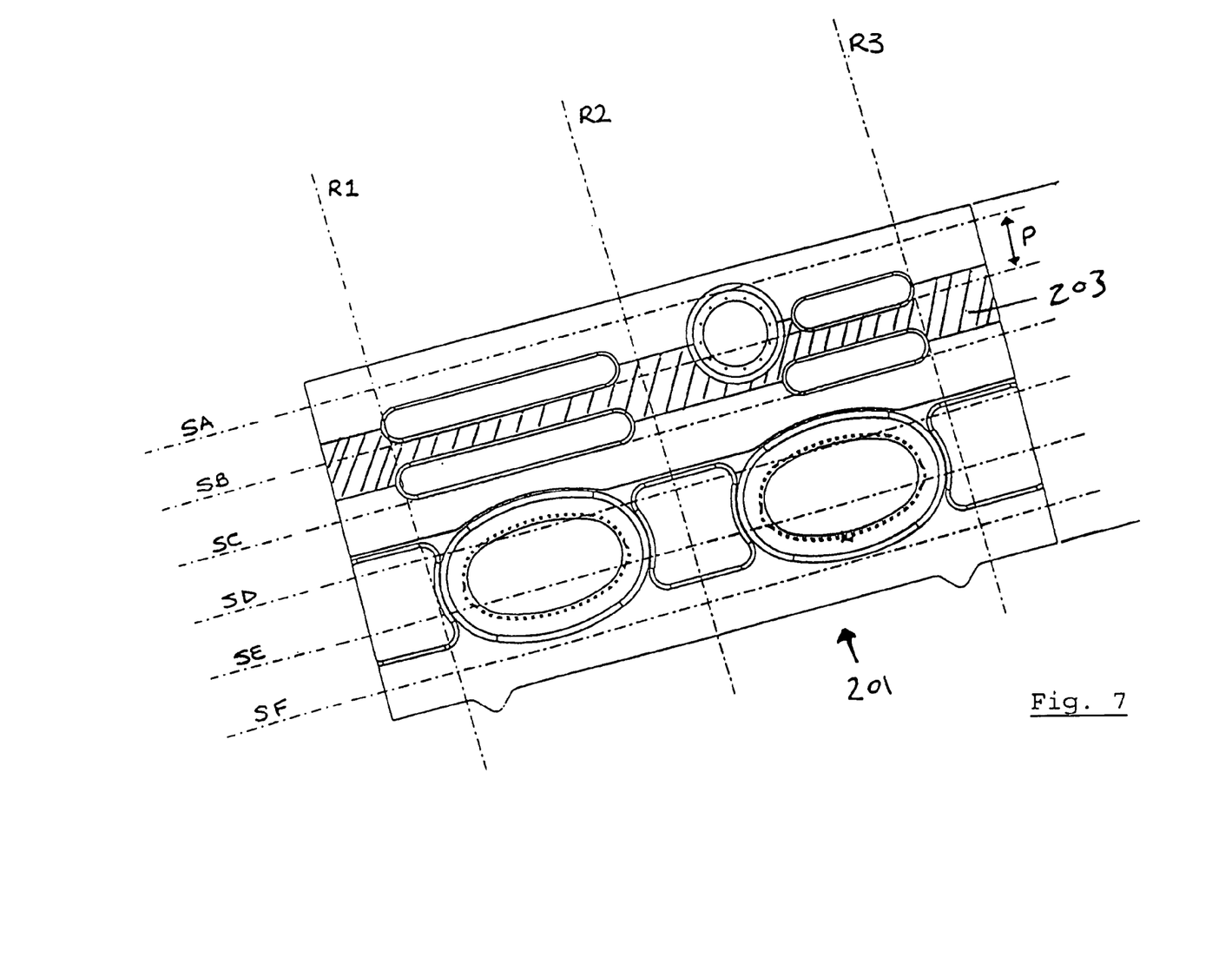
FIG. 7 shows a plan view of the test panel shown in FIG. 6.

FIGS. 6 and 7 show a test panel manufactured in accordance with a second embodiment of the present invention. FIG. 6 shows the panel 201 in perspective view and FIG. 7 shows the panel 201 in plan view. The thickness of the panel 201 varies from about 9 mm up to about 20 mm. The panel 201 includes regions for the provision of manholes (regions 11), inter-hole softening bosses (regions 12), fuel boss (region 13) and lightening pockets (regions 14). The datum lines R1, R2, R3 for the ribs of the wing box and the datum lines SA, SB, SC, SD, SE, SF for the stringers are shown in FIG. 7. It will be appreciated, with reference to FIG. 7, that the strips on the interior surface need to have varying width along their length in order to accommodate the various features on the interior surface. With reference to the strip 203 (see hatched region) associated with stringer SB, the strip has a maximum width equal to a stringer pitch P, the width reducing to accommodate the lightening pockets 14 and the fuel boss 13. At some parts along the length of a stringer there may be regions where the relevant strip stops completely to accommodate a feature. Also at other regions the strip may have a width greater than a stringer pitch P.

Figure 8:
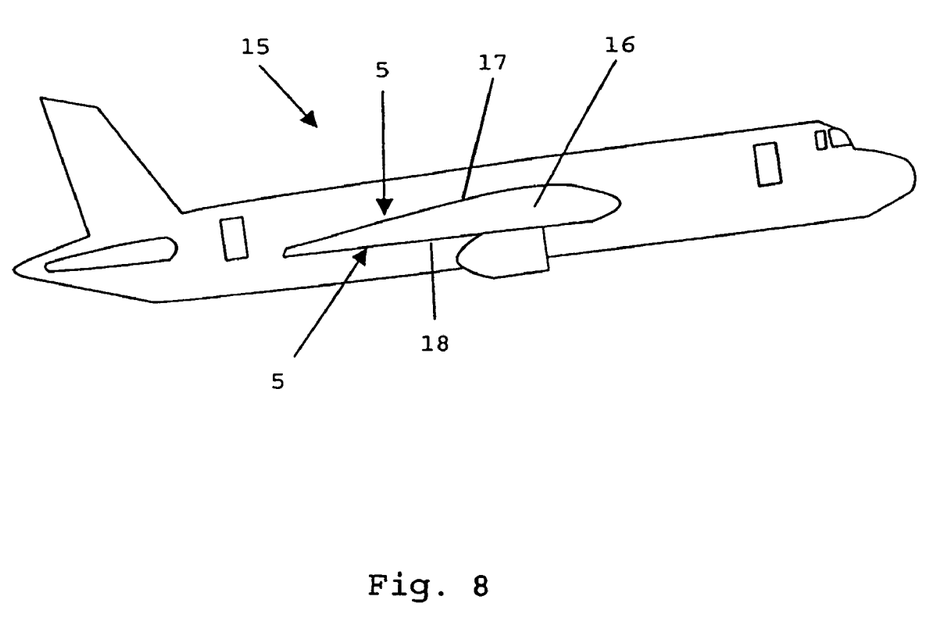
FIG. 8 shows an aircraft incorporating a wing skin in accordance with the first embodiment of the invention.

FIG. 8 shows an aircraft 15 having a wing structure including a wing box 16, the exterior surface 5 of the wing box being provided by eight different panels, each panel being in accordance with the above-described first embodiment of the present invention. The interior surface on which the strips may be seen are of course not visible from the exterior of the wing box 16 and are therefore hidden from view in FIG. 8. Four panels make up the upper wing skin 17 on each wing and four panels make up the lower wing skin 18 on each wing. There are therefore sixteen panels in total for the two wings. Each stringer in the wing box 16 is bonded along its length to the interior surface of the strip to which the stringer is associated. At most junctions between ribs and stringers the rib is connected to the stringer, the rib foot being connected via the stringer to a strip junction. At some junctions, at least part of the rib foot may be connected directly to the wing skin.

The wing skin panel 1 as illustrated by for example FIG. 5 is manufactured as follows. A monolithic block of aluminium alloy of conventional composition is first skimmed to provide a substantially flat surface on one side. Then the strips and other features of the wing skin are machined with a conventional milling machine fitted with a rotary cutting tool. The milling machine is arranged to mill each strip, one at a time, each strip requiring several passes, along its length, of the cutting tool. The reciprocal movements and the amount of vertical movement (normal to the wing skin panel surface) required to be made by the milling machine may, as a result, be significantly reduced in comparison to the case where facets are machined (for example, see the wing panel 101 of FIG. 1). (It will be understood that the massive nature of the milling machine makes such reciprocal movements both time and energy consuming.) After the interior surface 2 has been machined, the wing skin is formed into the required shape for use on a wing box in a conventional manner. Spars, ribs and stringers are also attached and assembled in a conventional manner. The wing skin may of course be finished by means of hardening processes and other finishing procedures, such as by means of shot peening, painting and similar treatment processes.

The design of a wing skin that is to be made by means of such a process (the interior surface being at least partly defined by strips as illustrated and described herein) significantly simplifies the design process of the wing skin and the wing box. In particular, the interrelation between designing the internal structure of the wing box and designing the wing skin may be greatly simplified.

It will be appreciated that various modifications could be made to both the first and second embodiments of the present invention. For example, the structure of the test panel of the second embodiment could easily be extended to a real wing skin panel, such as for example the wing panel according to the first embodiment. Also with reference to FIGS. 4a and 4b the boundary of each strip could be defined as being such that the wing skin has a constant thickness across the entire width of a strip, thereby resulting in the curved region joining and being interposed between the strips, rather than forming a part of a strip.

The invention claimed is:

1. An aircraft wing skin comprising a monolithic metal structure having a plurality of thicknesses, said monolithic metal structure including a first metallic surface for forming at least a part of the external surface of an aircraft wing and a second metallic surface opposite the first surface, wherein the second surface comprises a multiplicity of elongate sections extending in substantially the same direction, said aircraft wing skin thickness varying both in the direction along which the elongate sections extend and in a transverse direction from one elongate section to the next.

2. A wing skin according to claim 1, wherein the thickness of the wing skin is substantially constant across at least 90% of the width of an elongate section.

3. A wing skin according to claim 1, wherein the wing skin has a plurality of elongate section junctions, the elongate section junctions each extending between the longitudinal ends of two longitudinally spaced-apart elongate sections thereby joining two elongate sections in the direction in which the elongate sections extend, having an interface surface arranged to be able to receive a respective rib foot of a single rib extending along the wing skin, and being so arranged that the respective interface surfaces are substantially parallel to the first surface and substantially parallel to the surfaces of the rib feet that interface with the respective interface surfaces.

4. The wing skin according to claim 3 wherein the interface surface transitions between a first thickness and a second thickness.

5. A wing skin according to claim 1, wherein the multiplicity of elongate sections are adjacent to one another.

6. An aircraft wing-box including ribs, stringers extending transversely to the ribs, and a wing skin according to claim 1, wherein the elongate sections are so arranged that each elongate section is associated with a single stringer.

7. An aircraft wing skin comprising a monolithic metal structure having a plurality of thicknesses, said skin comprising a first metallic surface for forming at least a part of the external surface of an aircraft wing and a second metallic surface opposite the first surface, wherein the second surface comprises a multiplicity of elongate sections extending in substantially the same direction, the second surface being so shaped that if the wing skin were globally deformed so that the first surface were mapped onto a flat surface, there would be at least two elongate sections that, at respective points on a notional line that is perpendicular to the direction in which the elongate sections extend, have different gradients in the direction in which the elongate sections extend.

8. An aircraft wing skin comprising a monolithic metal structure having a plurality of thicknesses, said skin comprising a first metallic surface for forming at least a part of the external surface of an aircraft wing and a second metallic surface opposite the first surface, wherein the second surface comprises a multiplicity of elongate sections extending in substantially the same direction, the elongate sections having a thickness that varies both along a notional line along the length of each elongate section and from one elongate section to the next along a notional line transverse to the length of the elongate sections.

9. An aircraft with wing structure according to claim 8.

10. An aircraft wing skin comprising a monolithic metal structure having a plurality of thicknesses, said skin comprising a first surface for forming at least a part of the external surface of an aircraft wing, and a second surface opposite the first surface, the second surface comprising a multiplicity of elongate sections extending in substantially the same direction, said multiplicity of elongate sections have a thickness that varies along a notional line along the length of each elongate section, said multiplicity of elongate sections have a thickness that varies from one elongate section to the next along a notional line transverse to the length of the elongate section, and there is defined a step between two adjacent elongate sections of said multiplicity of elongate sections, the step having a maximum gradient of less than 1:1.

* * * * *